(12) United States Patent
Hao et al.

(10) Patent No.: US 11,416,238 B2
(45) Date of Patent: Aug. 16, 2022

(54) INTERACTION METHOD AND APPARATUS

(71) Applicant: BEIJING BYTEDANCE NETWORK TECHNOLOGY CO., LTD., Beijing (CN)

(72) Inventors: Xijie Hao, Beijing (CN); Tian Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/979,558

(22) PCT Filed: Apr. 4, 2019

(86) PCT No.: PCT/CN2019/081539
§ 371 (c)(1),
(2) Date: Sep. 10, 2020

(87) PCT Pub. No.: WO2019/196744
PCT Pub. Date: Oct. 17, 2019

(65) Prior Publication Data
US 2021/0004220 A1     Jan. 7, 2021

(30) Foreign Application Priority Data
Apr. 8, 2018 (CN) .................... 201810307507.X

(51) Int. Cl.
*G06F 8/65* (2018.01)
*G06F 3/04817* (2022.01)
*G06F 3/04845* (2022.01)

(52) U.S. Cl.
CPC ............ *G06F 8/65* (2013.01); *G06F 3/04817* (2013.01); *G06F 3/04845* (2013.01)

(58) Field of Classification Search
CPC ........................................................ G06F 8/65
(Continued)

(56) References Cited

U.S. PATENT DOCUMENTS

2007/0035472 A1   2/2007   Wang
2012/0098754 A1   4/2012   Kim
(Continued)

FOREIGN PATENT DOCUMENTS

CN   203102094 U   7/2013
CN   105320480 A   2/2016
(Continued)

OTHER PUBLICATIONS

International Patent Application No. PCT/CN2019/081539; Int'l Search Report; dated Jul. 3, 2019; 2 pages.

*Primary Examiner* — Ruay Ho
(74) *Attorney, Agent, or Firm* — BakerHostetler

(57) ABSTRACT

An interaction method and an interaction apparatus are provided. The first terminal device transmits the interface information to the second terminal device in response to the message confirming that the first terminal device is connected with the second terminal device. The interface information is used for generating the interaction interface by the second terminal device. The first terminal device acquires the operation instruction from the second terminal device, and executes the operation instruction to obtain the operation result. The operation instruction is the instruction for operating the interaction interface. The first terminal device generates the update instruction based on the operation result and transmits the update instruction to the second terminal device. The update instruction is used for updating the interaction interface by the second terminal device.

18 Claims, 7 Drawing Sheets

(58) Field of Classification Search
USPC ........... 715/763, 758; 345/2.3, 173; 709/217
See application file for complete search history.

(56) References Cited

U.S. PATENT DOCUMENTS

| | | | |
|---|---|---|---|
| 2014/0304366 A1* | 10/2014 | Fletcher | H04N 21/26258 709/217 |
| 2015/0009152 A1* | 1/2015 | Tang | G06F 3/0484 345/173 |
| 2016/0110152 A1* | 4/2016 | Choi | G06F 3/04842 345/2.3 |
| 2017/0235444 A1* | 8/2017 | Zhang | G06F 3/0481 715/758 |
| 2017/0255443 A1 | 9/2017 | Inagaki | |
| 2017/0344197 A1* | 11/2017 | Kolli | G06F 3/04845 |
| 2017/0364347 A1* | 12/2017 | Adler | G06F 8/65 |

FOREIGN PATENT DOCUMENTS

| | | | |
|---|---|---|---|
| CN | 105677329 A | 6/2016 | |
| CN | 106095084 A | 11/2016 | |
| CN | 106294843 A | 1/2017 | |
| CN | 106716956 A | 5/2017 | |
| CN | 106897005 A | 6/2017 | |
| CN | 107846617 A | 3/2018 | |

* cited by examiner

INTERACTION METHOD AND APPARATUS

The present application is the national phase application of International Patent Application No. PCT/CN2019/081539, titled "INTERACTION METHOD AND APPARATUS", filed on Apr. 4, 2019, which claims the priority to Chinese Patent Application No. 201810307507.X, titled "INTERACTION METHOD AND APPARATUS", filed on Apr. 8, 2018 with the Chinese Patent Office, both of which are incorporated herein by reference in their entireties.

FIELD

The present disclosure relates to the technical field of computers, and in particular to an interaction method and an interaction apparatus.

BACKGROUND

Terminal devices such as mobile phones and tablet computers have become essential tools for people's life and work due to their full functions. In order to achieve effects such as screen enlargement or remote operation, content displayed by a terminal device may be projected onto another terminal device, for example, a personal computer (PC), for display in the conventional technology. However, after the projection, a user can perform an operation only on a terminal device initiating the projection, which results in inconvenience in visual sense and operation to the user.

SUMMARY

In order to solve the above problems in the conventional technology, an interaction method and an interaction apparatus are provided according to the embodiments of the present disclosure. After content displayed by a first terminal device is projected onto a second terminal device, a user may perform an operation on the second terminal device, such that the user can operate more conveniently, thereby improving an experience of the user.

In a first aspect, an interaction method applied to a first terminal device is provided according to an embodiment of the present disclosure, which includes: transmitting, in response to a message confirming that the first terminal device is connected with a second terminal device, interface information to the second terminal device, where the interface information is used for generating an interaction interface by the second terminal device; acquiring an operation instruction from the second terminal device, and executing the operation instruction to obtain an operation result, where the operation instruction is an instruction for operating the interaction interface; and generating an update instruction based on the operation result, and transmitting the update instruction to the second terminal device, where the update instruction is used for updating the interaction interface by the second terminal device.

Compared with the conventional technology, the embodiments of the present disclosure have the following advantages. In the embodiments of the present disclosure, the first terminal device transmits the interface information to the second terminal device in response to the message confirming that the first terminal device is connected with the second terminal device. The interface information is used for generating the interaction interface by the second terminal device. The first terminal device acquires the operation instruction from the second terminal device, and executes the operation instruction to obtain the operation result. The operation instruction is the instruction for operating the interaction interface. The first terminal device generates the update instruction based on the operation result and transmits the update instruction to the second terminal device. The update instruction is used for updating the interaction interface by the second terminal device.

It can be seen that with the interaction method and the interaction apparatus according to the embodiments of the present disclosure, in a case where the content displayed by the first terminal device is projected onto the second terminal device, when the user performs an operation on the second terminal device, the second terminal device transmits an operation instruction corresponding to the operation to the first terminal device. The first terminal device executes the operation instruction, and transmits an update instruction to the second terminal device based on the operation result obtained by executing the operation instruction, such that the second terminal device updates the interaction interface displayed by the second terminal device. That is, the user can directly perform the operation on the second terminal device without having to perform the operation on the first terminal device, thereby making the user operate more conveniently, thus improving the experience of the user.

BRIEF DESCRIPTION OF THE DRAWINGS

In order to more clearly describe the technical solution in the embodiments of the present disclosure or the technical solution in the conventional technology, drawings to be used in the embodiments of the present disclosure or in the conventional technology are briefly described hereinafter. It is apparent that the drawings described below show merely the embodiments of the present disclosure, and those skilled in the art may obtain other drawings according to the provided drawings without any creative effort.

DETAILED DESCRIPTION OF EMBODIMENTS

In order to make those skilled in the art understand the technical solutions of the present disclosure better, the technical solutions in the embodiments of the present disclosure are described clearly and completely in conjunction with the accompanying drawings in the embodiments of the present disclosure hereinafter. It is apparent that the described embodiments are merely some rather than all of embodiments of the present disclosure. All other embodiments obtained by those skilled in the art based on the embodiments of the present disclosure without any creative work should fall within the protection scope of the present disclosure.

Exemplary Method

Figure 1:
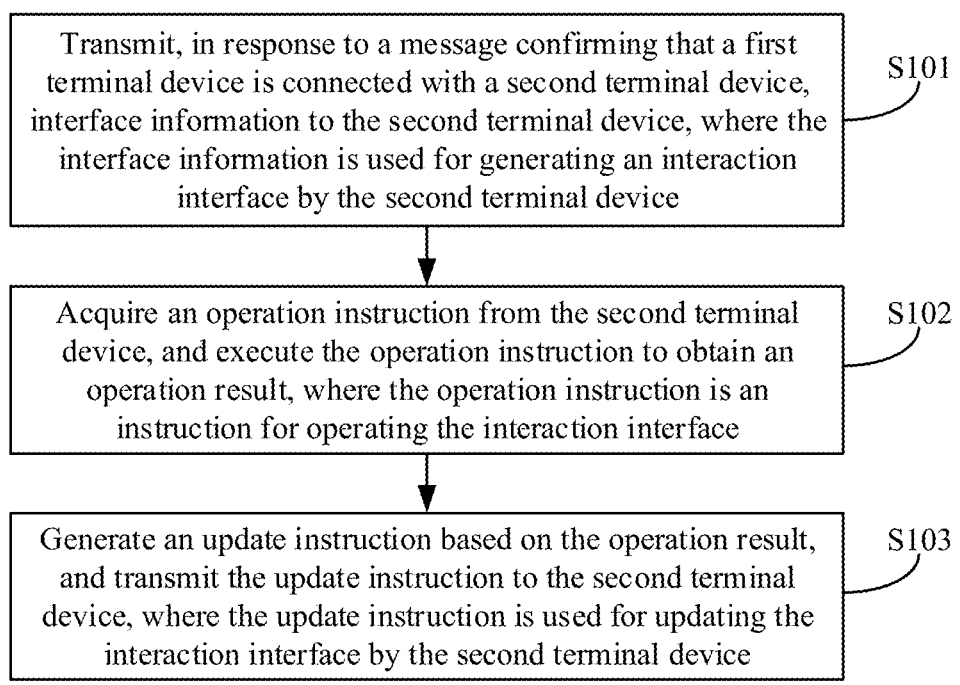
FIG. 1 is a schematic flowchart of an interaction method according to an embodiment of the present disclosure.

Reference is made to FIG. 1, which is a schematic flowchart of an interaction method according to an embodiment of the present disclosure. The interaction method according to the embodiment of the present disclosure may include the following steps S101 to S103. It is to be noted that the interaction method according to the embodiment of the present disclosure is applied to a first terminal device. In the embodiment of the present disclosure, the first terminal device may be a mobile terminal such as a smart phone, a tablet computer and a laptop computer, or may be a terminal device such as a desktop computer. The first terminal device is not limited in the embodiment of the present disclosure.

In step S101, interface information is transmitted to a second terminal device in response to a message confirming that the first terminal device is connected with the second terminal device. The interface information is used for generating an interaction interface by the second terminal device.

It is to be noted that, similarly to the first terminal device, the second terminal device mentioned in the embodiment of the present disclosure may be a mobile terminal such as a tablet computer or a laptop computer, or may be a terminal device such as a desktop computer. The second terminal device is not limited in the embodiment of the present disclosure.

It is to be noted that in the embodiment of the present disclosure, the first terminal device indicates a terminal device that initiates a projection, and the second terminal device indicates a terminal device that displays content displayed by the first terminal device in a projection manner.

For example, in a case where a user projects content displayed by a smart phone onto a laptop computer for display, the smart phone is the first terminal device mentioned in the embodiment of the present disclosure, and the laptop computer is the second terminal device mentioned in the embodiment of the present disclosure.

It is to be noted that the message confirming that the first terminal device is connected with the second terminal device mentioned in the embodiment of the present disclosure represents that the first terminal device may project the content displayed by the first terminal device onto the second terminal device for display. The message confirming that the first terminal device is connected with the second terminal device is not limited in the embodiment of the present disclosure. In an example, the message confirming that the first terminal device is connected with the second terminal device may be that the first terminal device detects that a USB port of the first terminal device establishes a connection with the second terminal device. In another example, the message confirming that the first terminal device is connected with the second terminal device may be that the first terminal device establishes a connection with the second terminal device through Bluetooth matching.

It is to be noted that the interface information in the embodiment of the present disclosure is related to content displayed on a screen of the first terminal device. In an example, the interface information may include an icon displayed on the screen of the first terminal device. In another example, the interface information may include a desktop background displayed on the screen of the first terminal device and the like.

Based on the interface information, the second terminal device may generate an interaction interface related to the content displayed by the first terminal device.

In step S102, an operation instruction from the second terminal device is acquired and executed to obtain an operation result. The operation instruction is an instruction for operating the interaction interface.

The operation instruction mentioned in the embodiment of the present disclosure indicates an operation instruction that can cause content displayed in the interaction interface to change.

It is to be noted that the operation instruction mentioned in the embodiment of the present disclosure may be triggered by the user. For example, the operation instruction may be triggered through clicking a right mouse button on the second terminal device by the user.

In step S103, an update instruction is generated based on the operation result, and the update instruction is transmitted to the second terminal device. The update instruction is used for updating the interaction interface by the second terminal device.

It is to be understood that, after the operation instruction is executed, the interaction interface may also be updated based on the operation result obtained by executing the operation instruction. Therefore, in the embodiment of the present disclosure, the first terminal device generates the update instruction based on the operation result obtained by executing the operation instruction, such that the second terminal device updates the interaction interface based on the update instruction.

Content of the update instruction is not specifically limited in the embodiment of the present disclosure. In an example, the update instruction may include information content related to the operation instruction that causes the currently displayed interaction interface to change. For example, in a case where the user triggers an operation instruction for creating a file on the second terminal device, the update instruction is content related to the newly created file.

With the interaction method according to the embodiment of the present disclosure, in a case where the content displayed by the first terminal device is projected onto the second terminal device, when the user performs an operation on the second terminal device, the second terminal device transmits an operation instruction corresponding to the operation to the first terminal device. The first terminal device executes the operation instruction, and transmits an update instruction to the second terminal device based on the operation result obtained by executing the operation instruction, such that the second terminal device updates the interaction interface displayed by the second terminal device. That is, the user can directly perform the operation on the second terminal device without having to perform the operation on the first terminal device, thereby making the user operate more conveniently, thus improving the experience of the user.

In a possible implementation of the embodiment of the present disclosure, the above-mentioned interface information may include shortcut layer interface information and underlying interface information. The shortcut layer interface information is used for generating a shortcut layer interface by the second terminal device. A shortcut of an application of the first terminal device is displayed in the shortcut layer interface. The underlying interface information is used for generating an underlying interface by the second terminal device. The shortcut layer interface is located above the underlying interface.

Figure 2A:
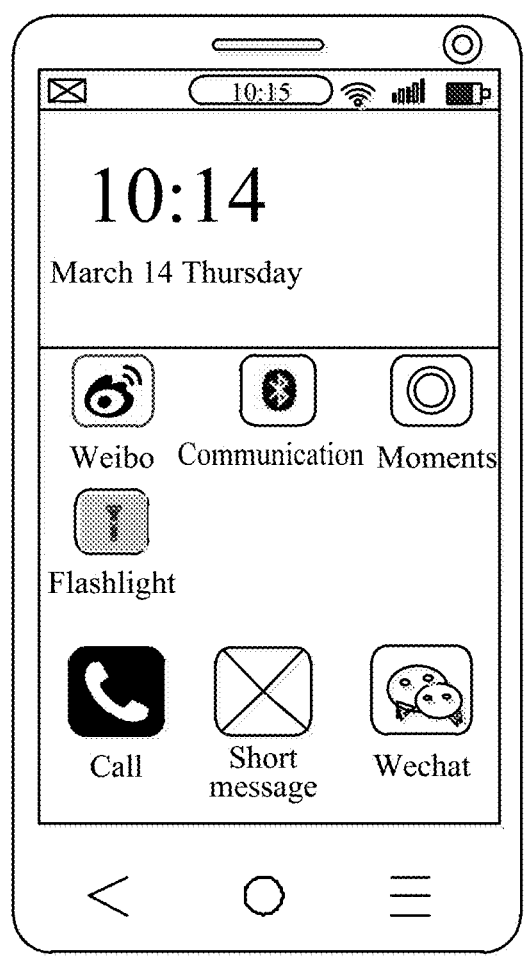
FIG. 2a is a schematic diagram of a display interface of a first terminal device according to an embodiment of the present disclosure.
Figure 2B:
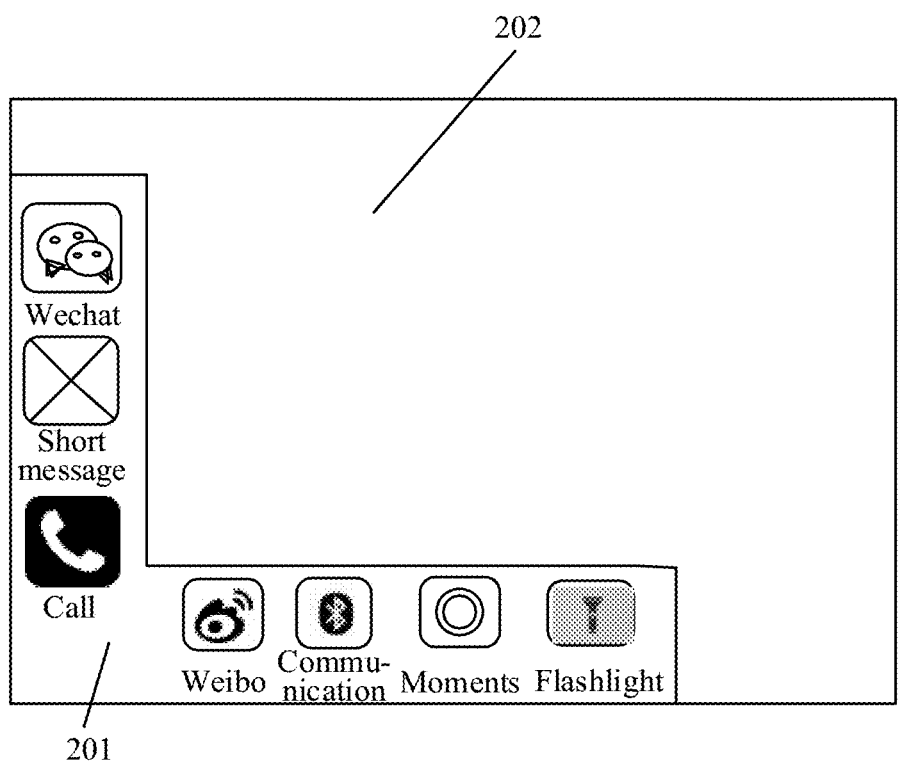
FIG. 2b is a schematic diagram of a display interface of a second terminal device according to an embodiment of the present disclosure.

In an example, reference is made to FIG. 2a and FIG. 2b. FIG. 2a is a schematic diagram of a display interface of a first terminal device according to an embodiment of the present disclosure. FIG. 2b is a schematic diagram of a display interface of a second terminal device according to an embodiment of the present disclosure.

As can be seen from FIG. 2a and FIG. 2b, shortcuts of applications installed on the first terminal device are all displayed in the shortcut layer interface 201 of the second terminal device. A reference sign 202 in FIG. 2b indicates the underlying interface, and the shortcut layer interface 201 is located above the underlying interface 202.

Furthermore, the operation instruction mentioned in the embodiment of the present disclosure may be an operation instruction related to the shortcut layer interface. That is, an operation corresponding to the operation instruction may be a content change operation for causing interface content of the shortcut layer interface to change. The operation instruction may also be an operation instruction related to the underlying interface. That is, an operation corresponding to the operation instruction may be an operation for causing interface content of the underlying interface to change. The embodiment of the present disclosure is not limited thereto.

The operation instruction related to the shortcut layer interface may be, for example, one or more of the following operation instructions: an operation instruction for moving a shortcut displayed in the shortcut layer interface and an operation instruction for operating an application corresponding to a shortcut displayed in the shortcut layer interface.

The operation instruction related to the underlying interface may be, for example, one or more of the following operation instructions: an operation instruction for adding a file or a folder in the underlying interface, an operation instruction for deleting a file or a folder in the underlying interface, an operation instruction for opening a file or a folder in the underlying interface, an operation instruction for moving a shortcut displayed in the shortcut layer interface to the underlying interface and an operation instruction for sorting pieces of content contained in the underlying interface.

In a possible implementation, there is a relationship between the operation result and the operation instruction in the embodiment of the present disclosure. That is, one operation instruction corresponds to one operation result. In an implementation, in a case where the operation instruction is an instruction for operating the application, the operation result includes an operation interface of the application corresponding to the shortcut after an operation corresponding to the operation instruction is performed on the application. For example, in a case where the operation instruction is a double click operation of the user on a shortcut "weibo" displayed in the shortcut layer interface 201 shown in FIG. 2b, the obtained operation result is a display interface obtained by opening an application corresponding to the shortcut "weibo".

As described above, the interface information includes the shortcut layer interface information and the underlying interface information. An implementation for generating the shortcut layer interface information by the first terminal device is described below with reference to the accompanying drawings.

It is to be understood that, the shortcut layer interface is used for displaying the shortcut of the application of the first terminal device. On one hand, a shortcut of each application of the first terminal device has a display position on the first terminal device. In a case where content displayed by the first terminal device is projected onto the second terminal device for display, the content displayed by the first terminal device is often to be displayed according to a display rule of the first terminal device to satisfy a reading habit of the user. For example, shortcuts displayed adjacently in the display interface of the first terminal device are also displayed adjacently in the interaction interface displayed by the second terminal device. Therefore, the shortcut layer interface information may be generated in conjunction with a display position of a shortcut of the application on the first terminal device and a preset display position of the shortcut layer interface.

On the other hand, since a size of a display screen of the first terminal device may be different from a size of a display screen of the second terminal device, in a case where the content displayed by the first terminal device is projected onto the second terminal device for display, a size of the shortcut of an application in the shortcut layer interface may be adjusted based on a size of the shortcut layer interface in the display screen of the second terminal device to achieve a good visual effect. Therefore, the shortcut layer interface information may be generated in conjunction with a display size of the shortcut of the application on the first terminal device and a preset size of the shortcut layer interface.

In view of this, in the embodiment of the present disclosure, the shortcut layer interface information may be generated in conjunction with a display position of the shortcut of the application on the first terminal device and a preset display position of the shortcut layer interface. In addition/Alternatively, the shortcut layer interface information may be generated in conjunction with the display size of the shortcut of the application on the first terminal device and the preset size of the shortcut layer interface.

Figure 3A:
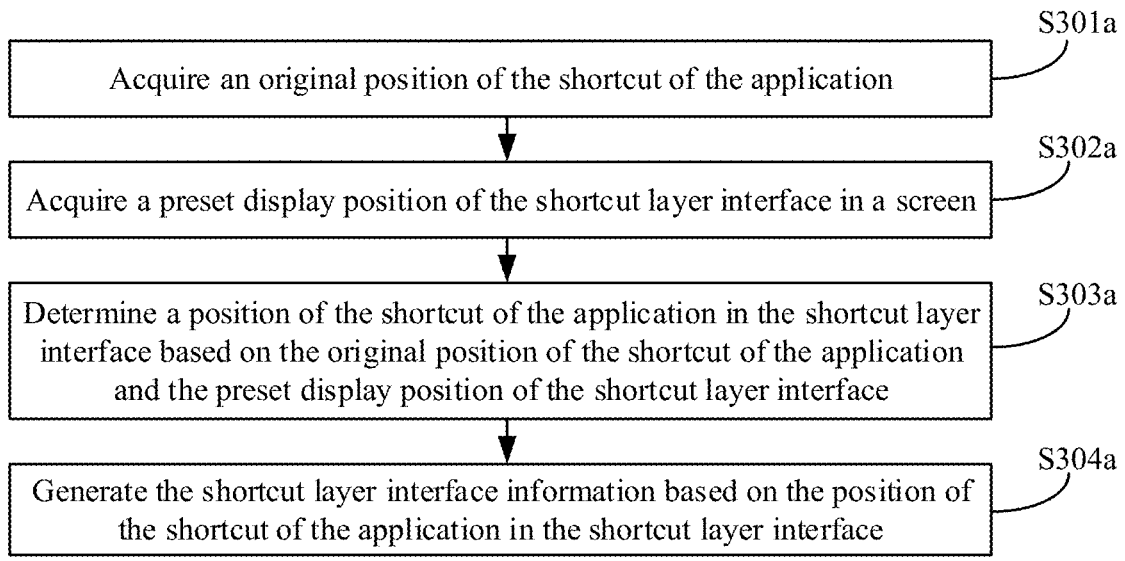
FIG. 3a is a schematic flowchart of a method for generating shortcut layer interface information according to an embodiment of the present disclosure.

Reference is made to FIG. 3a, which is a schematic flowchart of a method for generating shortcut layer interface information according to an embodiment of the present disclosure.

FIG. 3a is a schematic flowchart of a method for generating shortcut layer interface information based on a display position of a shortcut of an application on the first terminal device and a preset display position of the shortcut layer interface.

The method shown in FIG. 3a may include the following steps S301a to S304a.

In step S301a, an original position of the shortcut of the application is acquired.

The original position of the shortcut of the application indicates a display position of the shortcut of the application on the first terminal device. For example, the shortcut of the application is located on a certain line of a certain column of a grid on the screen.

In step S302a, a preset display position of the shortcut layer interface in the screen is acquired.

The preset display position is set in advance, which is not specifically limited in the embodiment of the present disclosure. For example, the preset display position may be located at a lower part of the screen of the second terminal device.

In step S303a, a position of the shortcut of the application in the shortcut layer interface is determined based on the original position of the shortcut of the application and the preset display location of the shortcut layer interface.

It is to be noted that in the embodiment of the present disclosure, a mapping relationship may be established for each application based on the original position of the shortcut of the application and the preset display position of the shortcut layer interface. The mapping relationship may be a mapping relationship between the original position of the shortcut of the application and the display position of the shortcut of the application in the shortcut layer interface. In this way, a position of the shortcut of the application in the shortcut layer interface is determined.

In step S304a, the shortcut layer interface information is generated based on the position of the shortcut of the application in the shortcut layer interface.

In the embodiment of the present disclosure, the shortcut layer interface information includes an identifier of the shortcut of the application, and the position of the shortcut of the application in the shortcut layer interface. Therefore, the second terminal device may display the shortcut of the application of the first terminal device in the shortcut layer interface based on the shortcut layer interface information.

Figure 3B:
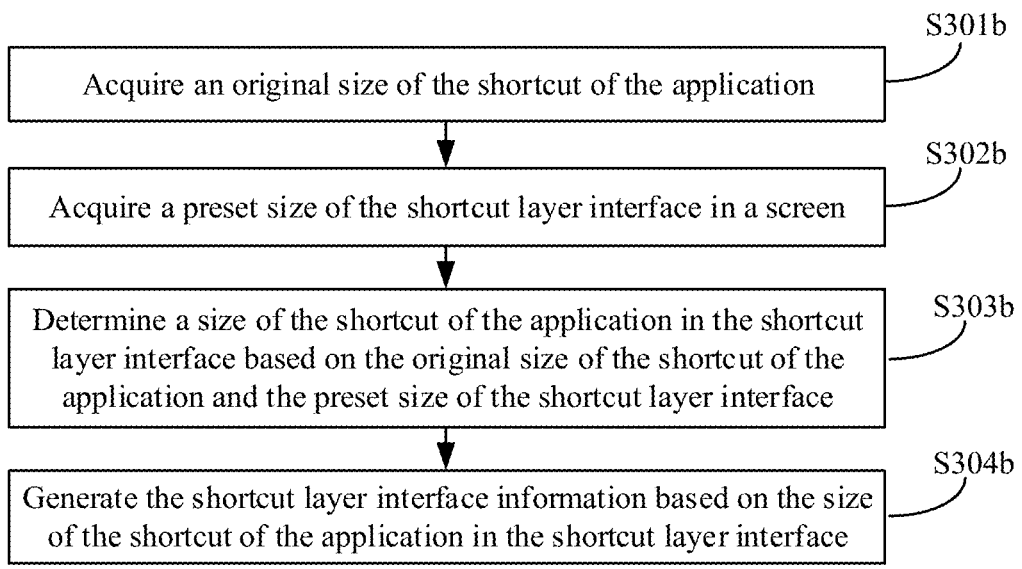
FIG. 3b is a schematic flowchart of a method for generating shortcut layer interface information according to another embodiment of the present disclosure.

Reference is made to FIG. 3b, which is a schematic flowchart of a method for generating shortcut layer interface information according to another embodiment of the present disclosure.

FIG. 3b is a schematic flowchart of a method for generating the shortcut layer interface information based on the display size of the shortcut of the application on the first terminal device and the preset size of the shortcut layer interface.

The method shown in FIG. 3b may include the following steps S301b to S304b.

In step S301b, an original size of the shortcut of the application is acquired.

The original size of the shortcut of the application mentioned in the embodiment of the disclosure indicates the display size of the shortcut of the application on the first terminal device.

In step S302b, a preset size of the shortcut layer interface in the screen is acquired.

The preset size is set in advance, which is not specifically limited in the embodiment of the present disclosure. The preset size may be set based on a size of the screen of the second terminal device.

In step S303b, a size of the shortcut of the application in the shortcut layer interface is determined based on the original size of the shortcut of the application and the preset size of the shortcut layer interface.

In an implementation of step S303b, a mapping relationship may be established for each application based on the original size of the shortcut of the application and the preset size of the shortcut layer interface. The mapping relationship may be a mapping relationship between the original size of the shortcut of the application and the display size of the shortcut of the application in the shortcut layer interface. In this way, a display size of the shortcut of the application in the shortcut layer interface is determined.

In step S304b, the shortcut layer interface information is generated based on the size of the shortcut of the application in the shortcut layer interface.

In the embodiment of the present disclosure, the shortcut layer interface information may include an identifier of the shortcut of the application, and the size of the shortcut of the application in the shortcut layer interface. Therefore, the second terminal device may display the shortcut of the application of the first terminal device in the shortcut layer interface with the size based on the shortcut layer interface information.

As described above, the operation instruction mentioned in the embodiment of the present disclosure may be an operation instruction related to the shortcut layer interface, or may be an operation instruction related to the underlying interface.

In a possible implementation, the operation instruction is the operation instruction related to the underlying interface, the operation corresponding to the operation instruction includes a content change operation for causing the interface content of the underlying interface to change. The executing the operation instruction to obtain the operation result in step S102 includes: performing an operation corresponding to the content change operation on content in a pre-created first folder. The updating corresponding to the update instruction mentioned in step S103 includes: changing the interface content of the underlying interface based on operation content of the content change operation.

It is to be noted that the content change operation for causing the interface content of the underlying interface to change mentioned in the embodiment of the present disclosure indicates that the interface content of the underlying interface after the content change operation is performed is different from the interface content of the underlying interface before the content change operation is performed.

It is to be noted that in the embodiments of the present disclosure, the interface content of the underlying interface is stored in the pre-created first folder. In a case where the content change operation for causing the interface content of the underlying interface to change is performed, the operation corresponding to the content change operation is performed on the content in the first folder. The interface content of the underlying interface is changed based on the result of the operation corresponding to the content change operation on the content in the first folder.

It is to be noted that the first folder mentioned in the embodiment of the present disclosure may be a folder created in a file system of the first terminal device. The position for creating the first folder is not specifically limited in the present disclosure, which may be determined based on a setting of the first terminal device.

As described above, in a case where the operation instruction is the operation instruction related to the underlying interface, the operation corresponding to the operation instruction includes the content change operation for causing the interface content of the underlying interface to change. There may be multiple content change operations for causing the interface content of the underlying interface to change. In the following, the content change operations for causing the interface content of the underlying interface to change are described one by one.

It is to be noted that information such as file types of the first file and the second file mentioned below is not limited in the embodiment of the present disclosure. A relationship between the first file and the second file is also not limited. The first file and the second file may be the same file or may be different files.

It is to be noted that relationships among the second folder, the third folder and the fourth folder mentioned below are not limited in the embodiment of the present disclosure. In an example, the second folder, the third folder and the fourth may be the same folder. In another example, the second folder, the third folder and the fourth folder may be different three folders. In another example, the second folder and the third folder are the same folder, and the fourth folder is another folder.

The content change operation for causing the interface content of the underlying interface to change may be an operation for creating a second folder and/or a first file in the underlying interface.

Correspondingly, after receiving the operation instruction, the first terminal device executes the operation instruction to obtain an operation result. The operation result may be that the first terminal device adds the created second folder and/or first file in the underlying interface information. In some application scenarios, the interface content of the underlying interface may be stored in a first folder pre-created by the first terminal device. In these application scenarios, the operation result may include: creating the second folder and/or the first file in the first folder.

After executing the operation instruction to obtain the operation result, the first terminal device generates an update instruction based on the operation result, and changes the interface content of the underlying interface based on the operation content of the content change operation. Specifically, the first terminal device adds a shortcut of the second folder and/or a shortcut of the first file in the underlying interface.

Figure 4:
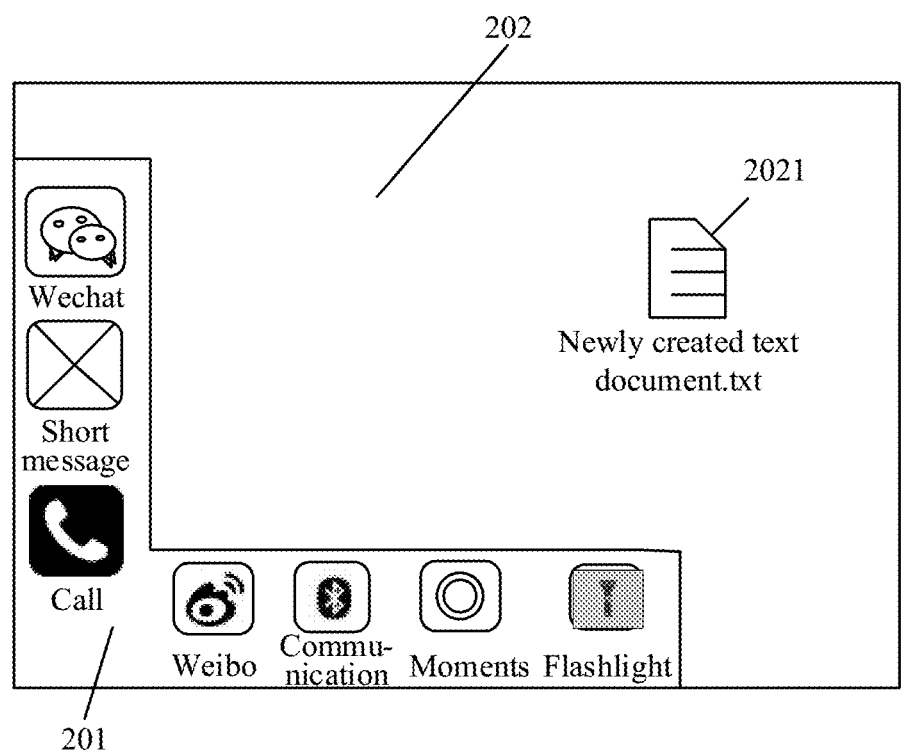
FIG. 4 is a diagram of a display interface after a file is created in an underlying interface according to an embodiment of the present disclosure.

That is, the user may perform the operation for creating a folder and/or creating a file in the underlying interface of the second terminal device. After the operation is performed, the created second folder and/or first file may be displayed in the underlying interface of the second terminal device. The user is unnecessary to perform the operation for creating a folder and/or creating a file on the first terminal device, thereby making the user operate more conveniently, thus improving the experience of the user. For example, referring to FIG. 4 and FIG. 2b, a display interface of the second terminal device is as shown in FIG. 2b. FIG. 4 is a schematic diagram of creating a file 2021 in the underlying interface, the file 2021 is a created notepad file. It is to be noted that FIG. 4 is merely a schematic illustration, the created file may also be a word file or a file with another format.

In a second aspect, the content change operation for causing the interface content of the underlying interface to change may be an operation for deleting a shortcut of a third folder and/or the shortcut of a second file displayed in the underlying interface.

Correspondingly, after receiving the operation instruction, the first terminal device executes the operation instruction to obtain an operation result. The operation result may include: deleting the third folder and/or the second file in the underlying interface information. In some application scenarios, the interface content of the underlying interface may be stored in a first folder pre-created by the first terminal device. In these application scenarios, the operation result may include: deleting the third folder and/or the second file pre-stored in the first folder.

It is to be understood that since the third folder and/or the second file are displayed in the underlying interface, the third folder and/or the second file are pre-stored in the first folder.

After the operation instruction for deleting the shortcut of the third folder and/or the shortcut of the second file displayed in the underlying interface, the third folder and/or the second file may be deleted from the first folder.

After executing the operation instruction to obtain the operation result, the first terminal device generates an update instruction based on the operation result, and changes the interface content of the underlying interface based on the operation content of the content change operation. Specifically, the first terminal device deletes the shortcut of the third folder and/or the shortcut of the second file displayed in the underlying interface.

That is, the user may perform the operation for deleting a folder and/or deleting a file in the underlying interface of the second terminal device. After the operation is performed, the deleted third folder and/or the second file may no longer be displayed in the underlying interface of the second terminal device. The user is unnecessary to perform the operation for deleting a folder and/or deleting a file on the first terminal device, thereby making the user operate more conveniently, thus improving the experience of the user.

In a third aspect, the content change operation for causing the interface content of the underlying interface to change may be an operation for moving a shortcut of an application displayed in the shortcut layer interface to the underlying interface.

After receiving the operation instruction, the first terminal device executes the operation instruction to obtain an operation result. Specifically, the first terminal device deletes the shortcut of the application stored in a database, and adding the shortcut of the application to the first folder.

It is to be noted that in the embodiments of the present disclosure, the shortcut of the application is stored in the database. The shortcut of the application stored in the database is displayed in the shortcut layer interface of the second terminal device in a case of projection.

In the embodiment of the present disclosure, the database may be a local database of the first terminal device, and may also be a cloud storage database, which is not limited in the embodiment of the present disclosure.

Therefore, in a case where the shortcut of the application is moved from the shortcut layer interface to the underlying interface, the shortcut of the application may be deleted from the database, so as to avoid the shortcut of the application from being displayed in the shortcut layer interface of the second terminal device.

As described above, the interface content of the underlying interface is stored in the first folder. The content in the first folder is displayed in the underlying interface of the second terminal device. Therefore, in the embodiment of the present disclosure, the shortcut of the application may also be added to the first folder to make the shortcut of the application be displayed in the underlying interface of the second terminal device.

After executing the operation instruction to obtain the operation result, the first terminal device generates an update instruction based on the operation result, and changes the interface content of the underlying interface based on the operation content of the content change operation. Specifically, the first terminal device deletes the shortcut of the application displayed in the shortcut layer interface, and adds the shortcut of the application in the underlying interface.

Figure 5:
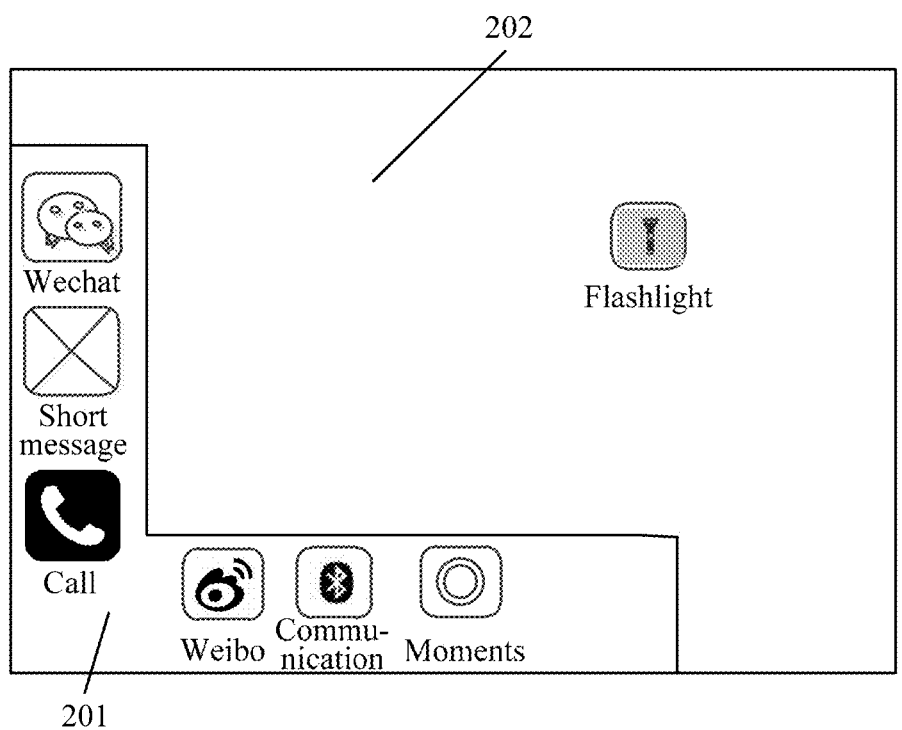
FIG. 5 is a diagram of a display interface after a shortcut of an application in a shortcut layer interface is moved to an underlying interface according to an embodiment of the present disclosure.

That is, the user may perform the operation for moving the shortcut of the application displayed in the shortcut layer interface to the underlying interface on the second terminal device. After the operation is performed, the shortcut of the application may be displayed in the underlying interface of the second terminal device instead of the shortcut layer interface. The user is unnecessary to perform an operation for moving the shortcut of the application on the first terminal device, thereby making the user operate more conveniently, thus improving the experience of the user. For example, referring to FIG. 5 and FIG. 2b, the display interface of the second terminal device is as shown in FIG. 2b. After a shortcut of an application "flashlight" displayed in the shortcut layer interface is moved to the underlying interface, the shortcut of the application "flashlight" disappears from the shortcut layer interface and is displayed in the underlying interface.

In a fourth aspect, the content change operation for causing the interface content of the underlying interface to change may be an operation for opening a fourth folder corresponding to a shortcut of the fourth folder displayed in the underlying interface.

Correspondingly, after receiving the operation instruction, the first terminal device executes the operation instruction to obtain an operation result. The operation result may include acquiring a shortcut of a subordinate content of a fourth folder stored in the above first terminal device. In some application scenarios, the interface content of the underlying interface may be stored in a first folder pre-created by the first terminal device. In these application scenarios, the operation result may include acquiring a shortcut of subordinate content of the fourth folder stored in the first folder.

The subordinate content included in the fourth folder is not limited in the embodiment of the present disclosure. The fourth folder may include a sub-folder, or may include a file. The fourth folder may also include both a sub-folder and a file.

It is to be noted that the fourth folder may be any folder pre-stored in the first terminal device. The shortcut of the subordinate content of the fourth folder may be pre-stored in the fourth folder. The fourth folder in the first terminal device may be determined based on the shortcut of the fourth folder, and then the shortcut of the subordinate content of the fourth folder may be acquired from the fourth file.

It is to be noted that shortcuts of all pieces of subordinate content of the fourth folder may be pre-stored in the first folder. Therefore, the shortcut of the subordinate content of the fourth folder may be acquired based on the first folder. Thus, the shortcut of the subordinate content of the fourth folder is displayed.

After executing the operation instruction to obtain the operation result, the first terminal device generates an update instruction based on the operation result, and changes the interface content of the underlying interface based on the operation content of the content change operation. Specifically, the first terminal device displays the shortcut of the subordinate content of the fourth folder in the underlying interface.

That is, the user may perform the operation for opening the folder displayed in the underlying interface on the second terminal device. After the operation is performed, the shortcut of the subordinate content of the folder may be displayed in the underlying interface of the second terminal device. The user is unnecessary to perform an operation for opening the folder on the first terminal device, thereby making the user operate more conveniently, thus improving the experience of the user.

In a fifth aspect, the content change operation for causing the interface content of the underlying interface to change may be an operation for sorting shortcuts displayed in the underlying interface according to a preset rule.

It is to be understood that, in practice, the user may add many files and/or folders in the underlying interface. In a case where the user searches for a specific file and/or folder, the user may have to search for the file and/or the folder based on an attribute of the file and/or the folder. In an example, the searching may be performed based on a creating time of the file and/or the folder. In another example, the searching may be performed based on a size of a storage space occupied by the file and/or the folder.

In view of this, in the embodiment of the present disclosure, a position of a shortcut displayed in the underlying interface may also be updated based on attribute information of content in the first folder. Therefore, the user may search for a specific file and/or folder based on the position of the shortcut displayed in the underlying interface, thereby making the user operate more conveniently, thus improving the experience of the user.

In an example, the first terminal device may record attribute information of each of pieces of content in the first folder.

The attribute information mentioned in the embodiment of the present disclosure includes but is not limited to one or more pieces of the following information: information on a time of adding the content, information on a size of a storage space occupied by the content, information on a file format of the content and the like.

Correspondingly, the content change operation for causing the interface content of the underlying interface to change may be the operation for sorting the shortcuts displayed in the underlying interface according to the preset rule.

It is to be noted that the operation for sorting the shortcuts displayed in the underlying interface according to the preset rule may be triggered by the user or may be triggered by the first terminal device, which is not specifically limited in the embodiment of the disclosure. In an example, the user may click the right mouse button and select the sorting operation, so as to trigger the operation for sorting the shortcuts displayed in the underlying interface according to the preset rule. In another example, the first terminal device may trigger the sorting operation every 5 minutes, or may trigger the sorting operation after the user triggers the above four operations.

It is to be noted that the preset rule is not specifically limited in the embodiment of the present disclosure. The preset rule may be set according to actual conditions. In an example, the preset rule may be a rule for sorting the shortcuts based on times of creating the shortcuts in chronological order or in an inversed order. In another example, the preset rule may be a rule for sorting the shortcuts based on a size of a storage space occupied by content corresponding to each of the shortcuts. In another example, the preset rule may be a rule for sorting the shortcuts based on a format of content corresponding to each of the shortcuts. The preset rule may also be another rule, which is not listed in detail here.

Correspondingly, after receiving the operation instruction, the first terminal device executes the operation instruction to obtain an operation result. Specifically, the first terminal device sorts the shortcuts of the pieces of content based on the attribute information of each of the pieces of content in the first folder according to the preset rule. The shortcuts of the pieces of content in the first folder are the same as the shortcuts displayed in the underlying interface.

It is to be understood that, since the interface content of the underlying interface is stored in the first folder, the shortcuts of the pieces of content in the first folder are the same as the shortcuts displayed in the underlying interface. The shortcuts in the first folder are all displayed in the underlying interface. The shortcuts displayed in the underlying interface are all stored in the first folder.

After executing the operation instruction to obtain the operation result, the first terminal device generates an update instruction based on the operation result, and changes the interface content of the underlying interface based on the operation content of the content change operation. Specifically, the first terminal device updates positions of the shortcuts displayed in the underlying interface based on an order of the shortcuts of the pieces of content.

That is, the first terminal device may update the positions of the shortcuts displayed in the underlying interface based on the sorting result, such that the user may search for a specific file and/or folder based on a position of a shortcut displayed in the underlying interface, thereby making the user operate more conveniently, thus improving the experience of the user.

Exemplary Apparatus

Based on the interaction method provided in the above embodiments, an interaction apparatus is further provided according to an embodiment of the present disclosure. An operation principle of the interaction apparatus is described in detail below with reference to the accompanying drawings.

Figure 6:
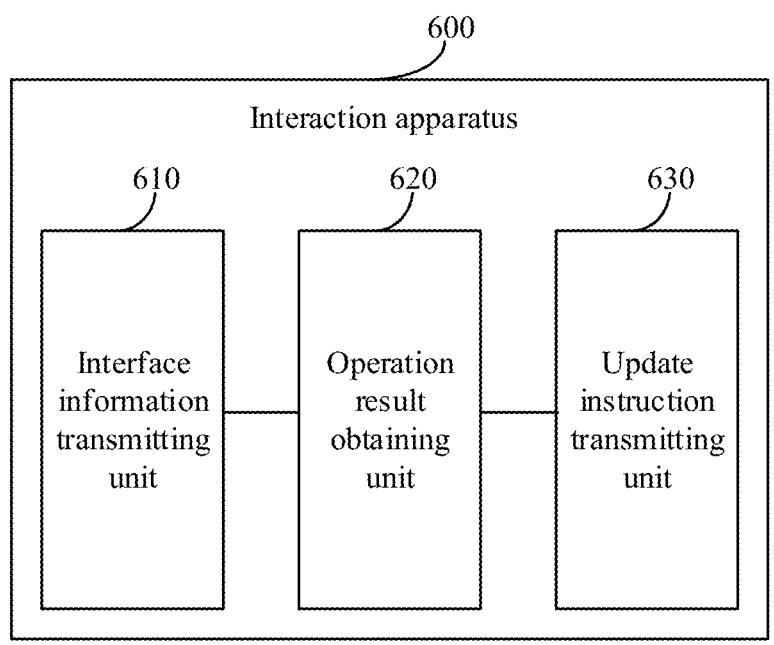
FIG. 6 is a block diagram of a structure of an interaction apparatus according to an embodiment of the present disclosure.

Reference is made to FIG. 6, which is a block diagram of a structure of an interaction apparatus according to an embodiment of the present disclosure.

The interaction apparatus 600 according to the embodiment of the present disclosure includes an interface information transmitting unit 610, an operation result obtaining unit 620 and an update instruction transmitting unit 630. The interface information transmitting unit 610 is configured to transmit, in response to a message confirming that a first terminal device is connected with a second terminal device, interface information to the second terminal device, where the interface information is used for generating an interaction interface by the second terminal device. The operation result obtaining unit 620 is configured to acquire an operation instruction from the second terminal device, and execute the operation instruction to obtain an operation result, where the operation instruction is an instruction for operating the interaction interface. The update instruction transmitting unit 630 is configured to generate an update instruction based on the operation result, and transmit the update instruction to the second terminal device, where the update instruction is used for updating the interaction interface by the second terminal device.

In an embodiment, the interface information includes shortcut layer interface information and underlying interface information. The shortcut layer interface information is used for generating a shortcut layer interface by the second terminal device, and a shortcut of an application of the first terminal device is displayed in the shortcut layer interface. The underlying interface information is used for generating an underlying interface by the second terminal device, and the shortcut layer interface is located above the underlying interface.

In an embodiment, the interaction apparatus further includes a first acquiring unit, a second acquiring unit, a position determining unit and an interface information generating unit. The first acquiring unit is configured to acquire an original position and/or an original size of the shortcut of the application. The second acquiring unit is configured to acquire a preset display position and/or a preset size of the shortcut layer interface in a screen. The position determining unit is configured to determine a position of the shortcut of the application in the shortcut layer interface based on the original position of the shortcut of the application and the preset display position of the shortcut layer interface in the screen; and/or, determine a size of the shortcut of the application in the shortcut layer interface based on the original size of the shortcut of the application and the preset size of the shortcut layer interface. The interface information generating unit is configured to generate the shortcut layer interface information based on the position of the shortcut of the application in the shortcut layer interface and/or the size of the shortcut of the application in the shortcut layer interface.

In an embodiment, the operation instruction includes an instruction for operating the application. The operation result includes that a display interface of an application corresponding to the shortcut is obtained after an operation corresponding to the operation instruction is performed on the application.

In an embodiment, an operation corresponding to the operation instruction includes: a content change operation for causing interface content of the underlying interface to change. The updating corresponding to the update instruction includes: changing the interface content of the underlying interface based on operation content of the content change operation.

In an embodiment, the content change operation for causing the interface content of the underlying interface to change includes: creating a second folder and/or a first file in the underlying interface. The changing the interface content of the underlying interface based on operation content of the content change operation includes: displaying the second folder and/or the first file on the underlying interface.

In an embodiment, the interface content of the underlying interface is stored in the pre-created first folder. The executing the operation instruction to obtain the operation result includes: performing, based on the content change operation, an operation corresponding to the operation instruction on the corresponding content in the first folder In an embodiment, the content change operation for causing the interface content of the underlying interface to change includes: creating a second folder and/or a first file in the underlying interface. The executing the operation instruction to obtain the operation result includes: creating the second folder and/or the first file in the first folder. The changing the interface content of the underlying interface based on the operation content of the content change operation includes: adding a shortcut of the second folder and/or a shortcut of the first file in the underlying interface.

In an embodiment, the content change operation for causing the interface content of the underlying interface to change includes: deleting a shortcut of a third folder and/or a shortcut of a second file displayed in the underlying interface. The changing the interface content of the underlying interface based on the operation content of the content change operation includes: deleting a shortcut of the third folder and/or a shortcut of the second file displayed in the underlying interface.

In an embodiment, the content change operation for causing the interface content of the underlying interface to change includes: deleting the shortcut of the third folder and/or the shortcut of the second file displayed in the underlying interface. The executing the operation instruction to obtain the operation result includes: deleting the third folder and/or the second file pre-stored in the first folder. The changing the interface content of the underlying interface based on the operation content of the content change operation includes: deleting the shortcut of the third folder and/or the shortcut of the second file displayed in the underlying interface.

In an embodiment, the content change operation for causing the interface content of the underlying interface to change includes: moving the shortcut of the application displayed in the shortcut layer interface to the underlying interface. The executing the operation instruction to obtain the operation result includes: deleting the shortcut of the application stored in a database, and adding the shortcut of the application to the first folder. The changing the interface content of the underlying interface based on the operation content of the content change operation includes: deleting the shortcut of the application displayed in the shortcut layer interface, and adding the shortcut of the application in the underlying interface.

In an embodiment, the content change operation for causing the interface content of the underlying interface to change includes: opening a fourth folder corresponding to a shortcut of the fourth folder displayed in the underlying interface. The executing the operation instruction to obtain the operation result includes: acquiring a shortcut of subordinate content of the fourth folder stored in the first folder. The changing the interface content of the underlying interface based on the operation content of the content change operation includes: displaying the shortcut of the subordinate content of the fourth folder in the underlying interface.

In an embodiment, the interaction apparatus further includes an attribute information recording unit. The attribute information recording unit is configured to record attribute information of each of pieces of content in the first folder. The content change operation for causing the interface content of the underlying interface to change includes: sorting shortcuts displayed in the underlying interface according to a preset rule. The executing the operation instruction to obtain the operation result includes: sorting shortcuts of the pieces of content based on the attribute information of each of the pieces of content in the first folder according to the preset rule, where the shortcuts of the pieces of content in the first folder are the same as the shortcuts displayed in the underlying interface. The changing the interface content of the underlying interface based on the operation content of the content change operation includes: updating positions of the shortcuts displayed in the underlying interface based on an order of the shortcuts of the pieces of content.

With the interaction apparatus according to the embodiments of the present disclosure, in a case where the content displayed by the first terminal device is projected onto the second terminal device, when the user performs an operation on the second terminal device, the second terminal device transmits an operation instruction corresponding to the operation to the first terminal device. The first terminal device executes the operation instruction, and transmits an update instruction to the second terminal device based on the operation result obtained by executing the operation instruction, such that the second terminal device updates the interaction interface displayed by the second terminal device. That is, the user can directly perform the operation on the second terminal device without having to perform the operation on the first terminal device, thereby making the user operate more conveniently, thus improving the experience of the user.

When introducing elements of various embodiments of the present disclosure, the articles "a", "an", "this", and "the" are intended to mean that there are one or more elements. The words "including", "comprising" and "having" are intended to be inclusive and mean that there may be additional elements other than the listed elements.

It is to be noted that those skilled in the art can understand that all or part of the processes in the above method embodiments may be implemented through instructing related hardware by a computer program. The program may be stored in a computer readable storage medium. When the program is executed, the program may perform the processes of the above method embodiments. The storage medium may be a magnetic disk, an optical disk, a read only memory (ROM), a random access memory (RAM) or the like.

The embodiments in this specification are described in a progressive manner. The same or similar parts among the embodiments can be referred to each other. Each embodiment focuses on a difference from other embodiments. Specifically, since the apparatus embodiment is basically similar to the method embodiment, the description to the apparatus embodiment is relatively simple, and for related parts, reference may be made to parts of the description to the method embodiment. The apparatus embodiments described above are merely illustrative, and the units and modules described as separate components may or may not be physically separated. In addition, some or all of the units and modules may be selected according to actual needs to achieve the purpose of the solution of the embodiments of the present disclosure. Those skilled in the art can understand and implement the solution of the embodiments of the present disclosure without any creative effort.

The above description is only specific implementations of the present disclosure, and it is to be pointed that for those skilled in the art, a number of improvements and embellishes may also be made without departing from the principle of the present disclosure. These improvements and embellishes are also regarded as being fell within the protection scope of the present disclosure.

The invention claimed is:

1. A computer-implemented method, comprising:
   transmitting, in response to a message confirming that a first computing device is connected with a second computing device, interface information to the second computing device, wherein the interface information is used for generating an interaction interface by the second computing device;
   acquiring an operation instruction from the second computing device, and executing the operation instruction to obtain an operation result, wherein the operation instruction is an instruction for operating the interaction interface;
   generating an update instruction based on the operation result, and transmitting the update instruction to the second computing device, wherein the update instruction is used for updating the interaction interface by the second computing device;
   wherein the interface information comprises shortcut layer interface information and underlying interface information, and wherein the shortcut layer interface information comprises an identifier of a shortcut of an application of the first computing device and information indicating a position of displaying the shortcut of the application on the second computing device;
   wherein a shortcut layer interface is generated by the second computing device based on the shortcut layer interface information, and the shortcut of the application of the first computing device is displayed in the shortcut layer interface based on the shortcut layer interface information; and
   wherein an underlying interface is generated by the second computing device based on the underlying interface information, and the shortcut layer interface is located above the underlying interface.

2. The method according to claim 1, further comprising:
   acquiring at least one of an original position or an original size of the shortcut of the application, wherein the original position of the shortcut of the application indicates a position of the shortcut of the application displayed on the first computing device, and the original size of the shortcut of the application indicates a size of the shortcut of the application displayed on the first computing device;

acquiring at least one of a preset display position or a preset size of the shortcut layer interface in a screen of the second computing device;

determining at least one of a position of the shortcut of the application in the shortcut layer interface based on the original position of the shortcut of the application and the preset display position of the shortcut layer interface in the screen, or a size of the shortcut of the application in the shortcut layer interface based on the original size of the shortcut of the application and the preset size of the shortcut layer interface; and generating the shortcut layer interface information based on at least one of the position of the shortcut of the application in the shortcut layer interface, or the size of the shortcut of the application in the shortcut layer interface.

3. The method according to claim 1, wherein the operation instruction comprises an instruction for operating the application, and the operation result comprises a display interface of an application corresponding to the shortcut after an operation corresponding to the operation instruction is performed on the application.

4. The method according to claim 1,
wherein an operation corresponding to the operation instruction comprises a content change operation for causing interface content of the underlying interface to change;
wherein the updating corresponding to the update instruction comprises changing the interface content of the underlying interface based on operation content of the content change operation.

5. The method according to claim 4,
wherein the content change operation for causing the interface content of the underlying interface to change comprises creating at least one of a second folder or a first file in the underlying interface; and
wherein the changing the interface content of the underlying interface based on operation content of the content change operation comprises displaying at least one of the second folder or the first file on the underlying interface.

6. The method according to claim 4,
wherein the interface content of the underlying interface is stored in a first folder;
wherein the executing the operation instruction to obtain the operation result comprises performing, based on the content change operation, an operation corresponding to the operation instruction on corresponding content in the first folder.

7. The method according to claim 6,
wherein the content change operation for causing the interface content of the underlying interface to change comprises creating at least one of a second folder or a first file in the underlying interface,
wherein the executing the operation instruction to obtain the operation result comprises creating at least one of a second folder or a first file in the first folder, and
wherein the changing the interface content of the underlying interface based on the operation content of the content change operation comprises adding at least one of a shortcut of the second folder or a shortcut of the first file in the underlying interface.

8. The method according to claim 6,
wherein the content change operation for causing the interface content of the underlying interface to change comprises deleting at least one of a shortcut of a third folder or a shortcut of a second file displayed in the underlying interface, and
wherein the executing the operation instruction to obtain the operation result comprises deleting at least one of the second folder or the first file which are stored in the first folder in advance, and
wherein the changing the interface content of the underlying interface based on the operation content of the content change operation comprises deleting at least one of a shortcut of the third folder or a shortcut of the second file in the underlying interface.

9. The method according to claim 6,
wherein the content change operation for causing the interface content of the underlying interface to change comprises moving the shortcut of the application displayed in the shortcut layer interface to the underlying interface,
wherein the executing the operation instruction to obtain the operation result comprises deleting the shortcut of the application stored in a database, and adding the shortcut of the application to the first folder, and
wherein the changing the interface content of the underlying interface based on the operation content of the content change operation comprises deleting the shortcut of the application displayed in the shortcut layer interface, and adding the shortcut of the application in the underlying interface.

10. The method according to claim 6,
wherein the content change operation for causing the interface content of the underlying interface to change comprises opening a fourth folder corresponding to a shortcut of the fourth folder displayed in the underlying interface;
wherein the executing the operation instruction to obtain the operation result comprises acquiring a shortcut of subordinate content of the fourth folder stored in the first folder; and
wherein the changing the interface content of the underlying interface based on the operation content of the content change operation comprises displaying the shortcut of the subordinate content of the fourth folder in the underlying interface.

11. The method according to claim 6, further comprising:
recording attribute information of each of pieces of content in the first folder;
wherein the content change operation for causing the interface content of the underlying interface to change comprises sorting shortcuts displayed in the underlying interface according to a preset rule;
wherein the executing the operation instruction to obtain the operation result comprises sorting shortcuts of the pieces of content based on the attribute information of each of the pieces of content in the first folder according to the preset rule, wherein the shortcuts of the pieces of content in the first folder are the same as the shortcuts displayed in the underlying interface;
wherein the changing the interface content of the underlying interface based on the operation content of the content change operation comprises updating positions of the shortcuts displayed in the underlying interface based on an order of the shortcuts of the pieces of content.

12. The method according to claim 4,
wherein the content change operation for causing the interface content of the underlying interface to change comprises deleting at least one of a shortcut of a third folder or a shortcut of a second file displayed in the underlying interface, and
wherein the changing the interface content of the underlying interface based on the operation content of the content change operation comprises deleting the at least one of the shortcut of the third folder or the shortcut of the second file displayed in the underlying interface.

13. An apparatus, comprising:
one or more processors; and
a storage device configured to store one or more programs, wherein
the one or more programs, when being executed by the one or more processors, cause the one or more processors to perform a method comprising:
transmitting, in response to a message confirming that a first computing device is connected with a second computing device, interface information to the second computing device, wherein the interface information is used for generating an interaction interface by the second computing device;
acquiring an operation instruction from the second computing device, and executing the operation instruction to obtain an operation result, wherein the operation instruction is an instruction for operating the interaction interface;
generating an update instruction based on the operation result, and transmitting the update instruction to the second computing device, wherein the update instruction is used for updating the interaction interface by the second computing device;
wherein the interface information comprises shortcut layer interface information and underlying interface information, and wherein the shortcut layer interface information comprises an identifier of a shortcut of an application of the first computing device and information indicating a position of displaying the shortcut of the application on the second computing device;
wherein a shortcut layer interface is generated by the second computing device based on the shortcut layer interface information, and the shortcut of the application of the first computing device is displayed in the shortcut layer interface based on the shortcut layer interface information; and
wherein an underlying interface is generated by the second computing device based on the underlying interface information, and the shortcut layer interface is located above the underlying interface.

14. A non-transitory computer-readable medium on which a computer program is stored, wherein the computer program, when being executed by a processor, causes a method comprising:
transmitting, in response to a message confirming that the first computing device is connected with a second computing device, interface information to the second computing device, wherein the interface information is used for generating an interaction interface by the second computing device;
acquiring an operation instruction from the second computing device, and executing the operation instruction to obtain an operation result, wherein the operation instruction is an instruction for operating the interaction interface; and generating an update instruction based on the operation result, and transmitting the update instruction to the second computing device, wherein the update instruction is used for updating the interaction interface by the second computing device;
wherein the interface information comprises shortcut layer interface information and underlying interface information, and wherein the shortcut layer interface information comprises an identifier of a shortcut of an application of the first computing device and information indicating a position of displaying the shortcut of the application on the second computing device;
wherein a shortcut layer interface is generated by the second computing device based on the shortcut layer interface information, and the shortcut of the application of the first computing device is displayed in the shortcut layer interface based on the shortcut layer interface information; and
wherein an underlying interface is generated by the second computing device based on the underlying interface information, and the shortcut layer interface is located above the underlying interface.

15. The apparatus according to claim 13, wherein the one or more programs, when being executed by the one or more processors, cause the device to:
acquiring at least one of an original position or an original size of the shortcut of the application, wherein the original position of the shortcut of the application indicates a position of the shortcut of the application displayed on the first computing device, and the original size of the shortcut of the application indicates a size of the shortcut of the application displayed on the first computing device;
acquiring at least one of a preset display position or a preset size of the shortcut layer interface in a screen of the second computing device;
determining at least one of a position of the shortcut of the application in the shortcut layer interface based on the original position of the shortcut of the application and the preset display position of the shortcut layer interface in the screen, or a size of the shortcut of the application in the shortcut layer interface based on the original size of the shortcut of the application and the preset size of the shortcut layer interface; and
generating the shortcut layer interface information based on at least one of the position of the shortcut of the application in the shortcut layer interface, or the size of the shortcut of the application in the shortcut layer interface.

16. The apparatus according to claim 13, wherein an operation corresponding to the operation instruction comprises:
a content change operation for causing interface content of the underlying interface to change,
the updating corresponding to the update instruction comprises:
changing the interface content of the underlying interface based on operation content of the content change operation.

17. The apparatus according to claim 16, wherein
the content change operation for causing the interface content of the underlying interface to change comprises:
creating at least one of a second folder and a first file in the underlying interface, and the changing the interface content of the underlying interface based on operation content of the content change operation comprises:
displaying the at least one of the second folder and the first file on the underlying interface.

18. The apparatus according to claim 16, wherein the interface content of the underlying interface is stored in a first folder, and the first folder is pre created;
the executing the operation instruction to obtain the operation result comprises:
performing, based on the content change operation, an operation corresponding to the operation instruction on corresponding content in the first folder.

* * * * *